United States Patent Office 3,809,726
Patented May 7, 1974

3,809,726
OLEFIN SEPARATION PROCESS

Hugh H. Horowitz, Elizabeth, and William E. Tyler III, Berkeley Heights, N.J., assignors to Esso Research and Engineering Company
No Drawing. Filed June 2, 1972, Ser. No. 259,251
Int. Cl. C07c 11/00
U.S. Cl. 260—677 A       15 Claims

ABSTRACT OF THE DISCLOSURE

An improved olefin separation process is effected by employing solutions of cuprous salts of the formula $CuO_2CC_nX_wX_yX_z$ wherein $n$ is an integer varying from 1 to 6, $X_w$, $X_y$ and $X_z$ are independently selected from the group consisting of fluorine, chlorine and bromine atoms, $w$, $y$ and $z$ are integers varying from 0 to $2n+1$ and where $w+y+z$ is $2n+1$, dissolved in aromatic solvent moieties comprising substituted and unsubstituted low volatile aromatics provide a medium, whereby gaseous olefins such as ethylene and propylene, may be selectively absorbed and separated from feedstreams containing them while undesirable side reactions are avoided. The cuprous salts preferably employed are cuprous perfluoroacetate, propionate and butyrate and mixtures thereof.

BACKGROUND OF THE INVENTION

This invention relates to a method for the separation of gaseous olefins from feedstreams by contacting the feedstreams with cuprous salts of halocarboxylic acids dissolved in aromatic solvent moieties comprising substituted and unsubstituted low volatile aromatics. The method comprises contacting the feedstreams containing the gaseous olefins with solutions of the Cu(I) complexing salts which remove the olefins from the feedstream by selective complexation methods. The olefins are thereafter recovered by suitable means, for example, ligand exchange or decomplexing at high temperatures and pressures or multiple staged flashing techniques.

In a preferred embodiment, solutions of cuprous perfluoroacetate in admixture with other cuprous halocarboxylic acid salts are employed to selectively absorb and separate gases such as ethylene and propylene from feedstreams containing them, while at the same time minimizing any side reactions.

DESCRIPTION OF THE PRIOR ART

Cuprous perfluoroacetate has been suggested for use in the separation of olefins from saturated hydrocarbons. There are, however, major drawbacks to the process as defined in the prior art when applied to gaseous olefins such as ethylene and propylene. Particular reference is made to U.S. 3,401,112, which describes the separation of nonaromatic, unsaturated, hydrocarbons from more saturated hydrocarbons by selective complex formation with cuprous perfluoroacetate dissolved in a solvent such as propionitrile. These separations have not been practical; the reasons being that (1) the solutions of the salt in polar nitrogeneous solvents such as propionitrile are too weakly complexing to absorb the ethylene or propylene readily; (2) the solutions in oxygenated solvents such as tetrahydrofuran undergo disproportionation reactions and therefore are not preferred; and (3) solutions in benzene as well as other types of solvents heretofore described have appreciable volatility and would therefore yield solvent as impurities in the decomplexed olefin stream. Additionally, solutions in benzene of these cuprous halocarboxylic acid salts tend to form solid complexes with ethylene which do not melt or dissolve below 100° C.

Other processes described for recovering complexible ligands such as olefins from feedstreams include the contacting of them with a cuprous halide salt contained in an anhydrous slurry in the presence of a $C_5$ monoolefin sorbent activator (see U.S. Pat. 3,410,924). Also a process is described in U.S. Pat. 3,218,366 which teaches the separation of olefins from hydrocarbon mixtures via a selective absorption method wherein silver fluoroborate or silver fluorosilicate is employed as the complexing material. A process for the separation of unsaturated hydrocarbons from an admixture with saturated hydrocarbons is taught by U.S. 3,517,081 wherein the feed is contacted with a salt, such as cuprous fluoroborate or cuprous fluorophosphate dissolved in aromatic hydrocarbon solvents such as toluene, ethylbenzene, xylene and the like.

Finally, in Ser. No. 805,912, now U.S. Pat. No. 3,651,519 and in Ser. No. 756,925 now U.S. Pat. No. 3,592,865 there is described the preparation and use of bimetallic salts, particularly cuprous tetrachloroaluminate which when dissolved in aromatic hydrocarbons are useful for the separation and recovery of complexible ligands by a ligand exchange process. However, cuprous complexing salts such as cuprous tetrachloroaluminate as well as cuprous tetrafluoroborate and the like in aromatic hydrocarbons tend to cause alkylation of the aromatic by the olefin or the polymerization of the olefin and therefore are not as yet practical. Accordingly an improvement in the operation of the prior art processes is thereby desirable.

SUMMARY OF THE INVENTION

In accordance with the present invention, a method of separating gaseous olefins from feedstream mixtures containing them is described, the method comprises contacting the feedstream mixtures with complexing solutions to complex the olefins and thereby remove them from the feedstream. These complexing solutions contain mixtures of cuprous salts of halocarboxylic acids. Generally these cuprous salts will have the formula $CuO_2CC_nX_wX_yX_z$ wherein $n$ is an integer varying from 1 to 6, $X_w$, $X_y$ and $X_z$ are independently selected from the group consisting of fluorine, chlorine and bromine atoms, $w$, $y$ and $z$ are integers varying from 0 to $2n+1$ and where $w+y+z$ is $2n+1$.

These cuprous salts or their admixtures are dissolved in low volatile aromatic solvents moieties, such as substituted and unsubstituted low volatile aromatics. The contacting is carried out under conditions whereby the olefins are selectively complexed to thereby remove them from the feedstream mixtures.

It has been unexpectedly discovered that the use of such complexing solutions tends to minimize side reactions such as alkylation and polymerization, while avoiding precipitate formation and minimizing product contamination with solvent vapors at the same time. Accordingly the method provides an efficient way of separating and recovering gaseous olefins such as ethylene and propylene from feedstream mixtures containing them.

Another discovery of the present invention relates to the fact that solubility of the cuprous salts of halocarboxylic acids may be greatly enhanced by the proper selection of the aromatic solvent mixture. It is believed that the stability is related to the nature and degree of substitution on the aromatic rings which in turn is believed to effect the salt's solubility; however, there is no intention to be bound by any specific theory. Hence the criteria for selecting aromatic solvents for use in the present invention are two: (1) the choice of an aromatic solvent having the proper structure to give the maximum cuprous salt solubility and (2) choice of a solvent that will have a high enough boiling point and may be considered low volatile so as to avoid being flashed off with the olefin in the decomplexing stage.

Accordingly the aromatic solutions of cuprous perfluoroacetate in admixture with other cuprous salts of halocarboxylic acids absorb ethylene and propylene reversibly and unlike other cuprous complexing salts such as cuprous tetrachloroaluminate, the present solutions do not cause alkylation of the aromatic with olefin or polymerization of the olefin.

Additionally, it has been found that the difficulty encountered in using cuprous perfluoroacetate in a practical system to separate ethylene from ethane may be overcome by operation of the present process. This eluded-to difficulty is the precipitation of the ethylene complex at temperatures below 110° C. In most processes it is desirable to maintain the complex in the liquid state for efficient operation; it is also desirable to complex the ethylene at a temperature as near ambient as possible so that as high a loading as possible can be obtained. Hence, in order to overcome the crystallization problem, it was found that by using mixtures of the various solvents together with mixtures of anion types this problem could be substantially eliminated. It has been found that of the solvents tried, methyl biphenyl and diphenylmethane produce the lowest crystallization temperature; when this combination is used together with cuprous halo salt admixtures such as a 50–50 mixture of cuprous chlorodifluoroacetate and cuprous pentafluoropropionate, the process becomes an efficient one for complexing ethylene at the desirable temperatures.

The process is suitable for separating a wide variety of complexible ligands, most preferably however, gaseous olefins. However, other ligands may be separated and include acetylenes, aromatics, carbon monoxide, more specifically, unsaturated hydrocarbons such as $C_2$ to $C_6$ acetylene, preferably $C_2$ to $C_4$ acetylene, for example acetylene, methylacetylene, ethylacetylene, dimethylacetylene, vinylacetylene, etc. Monoolefins such as $C_2$ to $C_{20}$ monoolefins, preferably $C_2$ to $C_{10}$, more preferably $C_2$ to $C_5$ monoolefins, most preferably, gaseous ethylene and propylene, conjugated diolefins, such as $C_4$ to $C_{10}$, preferably $C_3$ to $C_6$, for example butadiene, isoprene. Polyolefins such as $C_6$ to $C_{16}$, preferably $C_6$ to $C_{12}$ for example, cyclododecatriene, cyclooctadiene, cyclic olefins and alicyclic olefins such as $C_5$ to $C_{10}$, preferably $C_6$ to $C_8$ olefins, for example cyclopentene, cyclohexene, cyclooctene.

Generally the complexible ligand, i.e., olefin, to be separated by the process is contained in a feedstream in admixture with other components which are not as preferentially complexed for example, feedstreams such as ethane-ethylene/propanepropylene or ethane-propane/ethylene-propylene admixtures can be treated to concentrate the olefins.

The cuprous salt employed in the present process is generally described as a cuprous halocarboxylic acid salt, which is one having the formula $CuO_2CC_nX_wX_yX_z$ wherein $n$ is an integer varying from 1 to 6, $X_w$, $X_y$ and $X_z$ are independently selected from the group consisting of fluorine, chlorine and bromine atoms, $w$, $y$ and $z$ are integers varying from 0 to $2n+1$ and where $w+y+z$ is $2n+1$.

In general any carboxylic acid salt of copper with a carbon number range from 2 to 20 together with a perfluoro, perchloro, or fluorochloro substituent will work in the operation of the present process. Nonlimiting representative examples of cuprous salts that are operable in the process include $CuO_2CCF_3$, $CuO_2$, $CCF_2Cl$, $CuO_2CC_3F_7$, $CuO_2CC_2F_5$, etc. and their mixtures. Any of the above salts may be employed alone but preferably is employed in admixture with one or other of the remaining salts such that proper solubility for the ethylene complex may be provided.

As has been previously described, the cuprous salts are dissolved in selected solvents. The criteria for selecting the proper solvent is whether or not the solvent's structure is one which will provide optimum solubility for the cuprous salt and that said solvent is further characterized in being low volatile. By low volatile is meant that the aromatic solvent moieties will have a boiling point in the range of from about 120 to 500° C., preferably from about 150 to 350° C., and most preferably from about 180 to 320° C. Additionally, the low volatile aromatic solvent materials may be substituted or unsubstituted. By substituted is meant that the aromatic rings will have attached alkyl side chains having from 1 to 20 carbon atoms, more preferably from 1 to 10 carbon atoms and most preferably from 1 to 6 carbon atoms; substituted furthermore means that the aromatic ring may contain groups such as chloro or bromo etc., or their mixtures.

Nonlimiting representative examples of low volatile substituted aromatic moieties useful as solvents in the operation of the present process include toluene, xylene, ethylbenzene, cumene, mesitylene, n-butylbenzene, t-butylbenzene, diethylbenzene, cyclohexylbenzene, 1-phenylhexane, t-diisopropylbenzene, triisopropylbenzene, methyl biphenyl, isopropyl biphenyl, chlorobenzene, o-chlorotoluene, m-chlorotoluene and p-chlorotoluene, 2-chloro m-xylene and the like and their mixtures.

The capacity of the complexing solution containing the dissolved cuprous fluorocarboxylic acid salts in the various low volatile aromatic solvents is defined as the moles of ethylene complex per mole of copper at a given pressure, and said capacity should be in a range of from 0 to 1 depending on the temperature and pressure. In general the capacity N is given by the equation $$N = \frac{KP}{1+KP}$$

where P is the olefin pressure and K is an equilibrium constant (here the solubility of the olefin in this solvent is negligible and only the olefin in the complex is considered in deriving such as equilibrium constant). The value of K depends upon the temperature as given by the equation $K = K_o e^{-\Delta H/RT}$ wherein $\Delta H$ is the heat of complexation, R is the gas constant and T the absolute temperature. The $K_o$ and $\Delta H$ values are such that N varies from about 0.01 to 0.3 at 100° C. and pressures below one atmosphere up to about 0.7 to 0.99 at room temperature and pressures above 3 atmospheres.

The process is operable at a wide variety of temperature and pressure conditions, for example, for any complexing reaction, temperatures may range from about 0° to about 200° F. preferably from 30 to 160° F. and more preferably from ambient to about 125° F.; pressures similarly may vary widely and may range from about 0.01 atmospheres to about 10 atmospheres (olefin partial pressure).

Recovery of the olefin and other desired ligands can be carried out in a variety of ways. Disassociation or decomplexing by high pressure decomplexation or multiple stage flashing techniques, the latter being adequately described in copending application Ser. No. 259,078 now U.S. Pat. No. 3,755,487 herein incorporated by reference.

In a typical reaction sequence, ethylene and propylene may be recovered from a feedstream. The feedstream may be obtained from the light-ends section of a conventional steam cracking unit, from which acetylene and carbon monoxide may have been previously removed by cuprous ammonium acetate complexing and conventional carbon monoxide absorption; such a feedstream contains methane, ethane, propane and hydrogen, in addition to desired ethylene and propylene ligands. These desired olefins can be recovered in purities exceeding 95%, preferably exceeding 99% by the process of this invention wherein the above-described feedstreams are contacted with complexing solutions comprising low volatile aromatic solvent moieties in which is dissolved admixtures of cuprous salts of halocarboxylic acids, such as a 50–50 mixture of cuprous chlorodifluoroacetate and cuprous pentafluoropropionate. The preferred aromatic solvent being diphenylmethane.

The present invention may be illustrated but is not necessarily limited to the following examples.

EXAMPLE I

Cuprous trifluoroacetate was prepared by slurrying $Cu_2O$ (184.0 g.—1.29 moles) in 280 g. of trifluoroacetic anhydride, then adding slowly 348 g. trifluoroacetic acid. After approximately one third of the acid had been added, the reaction mixture became very thick and 225 g. of trifluoroacetic anhydride was added. The reaction was refluxed overnight with stirring. The reaction solution was then filtered under a nitrogen atmosphere and the solid dissolved in 700 ml. toluene. The solution was filtered to remove unreacted $Cu_2O$ and the solvent stripped to give a light green solid. This was washed with 1.5 l. of hexane to remove the green color. The solid was collected by filtration and dried under vacuum to yield 387 g. (85%), M.P. 195°–200°.

Percent Cu: Found, 30.3. Theory for $$CuO_2CCF_3 \cdot 0.5HO_2CCF_3,$$

30.4. The product was found to contain approximately 0.5 mole trifluoroacetic acid. This could be removed by heating under vacuum and collecting the off-gas. The off-gas was identified as trifluoroacetic acid.

EXAMPLE II

A solution of cuprous trifluoroacetate (11.0 g.) as prepared above, containing 0.5 moles trifluoroacetic acid, in cyclohexyl benzene (20.0 g.) was prepared. This solution was used to obtain the solubility of ethylene and ethane as a function of the pressure of each gas above the solution at 135° C. This data is summarized below:

| | $N_{c2^-}\left(\dfrac{\text{Moles } C_2^-}{\text{Mole Cu}}\right)$ | $N_{c2^o}\left(\dfrac{\text{Moles } C_2^o}{\text{Mole Cu}}\right)$ |
|---|---|---|
| P (atm.) partial pressure: | | |
| 1.0 | .34 | .01 |
| 2.0 | .55 | .05 |
| 4.0 | .80 | .13 |
| 6.0 | .95 | .21 |
| 8.0 | 1.04 | .29 |
| 10.0 | 1.12 | .37 |

From this may be calculated an $\alpha$ at a number of pressures.

| | $\alpha = (N_{c2^-}/N_{c2^o})$ |
|---|---|
| P (atm.): | |
| 1.0 | 34.00 |
| 2.0 | 11.00 |
| 4.0 | 6.15 |
| 6.0 | 4.53 |
| 8.0 | 3.59 |
| 10.0 | 3.02 |

A process may be readily envisioned in which ethylene is separated from ethane. The gas mixture may be passed through a solution of the cuprous salt at high pressure, say six atmospheres. This saturated solution is pumped to a decomplexer where the pressure is lowered to one atmosphere and the gas removed. Multiple stages could be used to achieve higher purity ethylene.

EXAMPLE III

In this example, cuprous trifluoroacetate was dissolved in mixed mono-isopropyl biphenyl at a ratio of 1 mole of salt to about 1.5 moles of aromatic. The resulting solution absorbed propylene. The resulting solution showed no evidence of copper deposition at 50° C. for 18 hours or after ten more days at room temperature.

In another example, a solution of cuprous trifluoroacetate was prepared at a ratio of one mole of cuprous trifluoroacetate to two moles of mixed isopropyl biphenyl. At 100° C. this solution absorbed 0.7 mole of ethylene while at 140° C. the amount of ethylene absorbed dropped to 0.07 mole of ethylene per mole of copper. The solution maintained its reversibility to the absorption of ethylene unchanged after heat soaking at 140° C. for six days. These results show the high stability which may be effected for the copper trifluoroacetate by the use of certain aromatic solvent materials.

EXAMPLE IV

The solubility of cuprous trifluoroacetate was determined in a number of solvents by saturating the solvent with cuprous trifluoroacetate at 25° C. The percent Cu was determined and mole solvent/moles Cu calculated. The data which are summarized in the table below show the various solvents which may be employed with CuTFA in an olefin complexing process.

TABLE I.—SOLUBILITY OF CuTFA IN VARIOUS SOLVENTS

| Solvent | Percent Cu | Mole solvent/ mole Cu |
|---|---|---|
| Benzene | 9.95 | 5.52 |
| Toluene | 21.05 | 1.02 |
| Xylene | 20.95 | .90 |
| Ethyl benzene | 23.37 | .60 |
| Cumene | 21.63 | .71 |
| Mesitylene | 11.88 | 2.72 |
| n-Butyl benzene | 22.60 | .54 |
| t-Butyl benzene | 21.79 | .62 |
| Diethyl benzene | 18.56 | 1.00 |
| Cyclohexyl benzene | 17.39 | .98 |
| 1-phenyl hexane | 20.85 | .60 |
| p-Di-isopropyl benzene | 16.54 | 1.09 |
| Tri-isopropyl benzene | 6.80 | 3.56 |
| Methyl biphenyl | 2.60 | 13.30 |
| Isopropyl biphenyl | 12.29 | 1.57 |
| Chlorobenzene | 7.37 | 5.81 |
| o-Chlorotoluene | 15.50 | 1.59 |
| m-Chlorotoluene | 18.30 | 1.10 |
| p-Chlorotoluene | 10.60 | 3.09 |
| 2-chloro-m-xylene | 11.50 | 3.45 |

EXAMPLE V

A determination was made of the temperature at which the ethylene complex of a number of cuprous salts crystallized from various solvents. The measurements were made by charging a glass reactor with the appropriate salt dissolved in a solvent, then pressurizing the vessel to a constant pressure of ethylene by means of a back pressure regulator. The reactor was heated in a bath and the temperature noted when the solution was clear. The bath temperature was lowered and the temperature noted when the first crystals appeared. The difference in the two temperatures is a function of how fast the bath is heated or cooled and thus how close to thermal equilibrium the solution is maintained. The object of this experiment was to determine the system of salts and solvents which gave the lowest temperatures, for operation of the system, before crystallization occurs and hence insuring that solids formation would not interfere with a separations process. The olefin complexing process is therefore to be operated above the temperatures indicated with the particular salts, solvents and pressures employed. The data for a number of cuprous salt-solvent systems are summarized in the table below. The last four data points in this table show that operating temperatures for olefin complexing processes may be lowered by using mixtures of Cu(I) salts as specified.

TABLE II.—CRYSTALLIZATION OF THE ETHYLENE COMPLEX

| Compound | Solvent (moles solvent ÷ moles Cu) | | Temperature range, °C.[1] | |
|---|---|---|---|---|
| | | | $C_2$-pressure, p.s.i.g. of— | |
| | | | 25 | 75 |
| A | I | (2:1) | 114–120 | 118–123 |
| B | I | (2:1) | 86–94 | 90–95 |
| C | I | (2:1) | 114–120 | 120–125 |
| D | I | (2:1) | 85–92 | 86–92 |
| D | II | (2:1) | 71–81 | 69–81 |
| D | III | (2:1) | 70–80 | 70–78 |
| D | IV | (2:1) | 84–89 | 83–90 |
| D | V | (2:1) | 75–79 | 75–80 |
| D | VI | (2:1) | 80–85 | 79–85 |
| D | V | (1:1) | 88–92 | 88–92 |
| A plus C (1:1) | I | (2:1) | 72–81 | 76–88 |
| B plus D (1:1) | I | (2:1) | 75–80 | 75–79 |
| B plus D (1:1) | III | (2:1) | 57–64 | 57–65 |
| A plus D (1:1) | III | (2:1) | 71–78 | 68–80 |

[1] First temperature is where crystals first appear, second temperatures where the crystals disappear.

NOTE.—A=$CuO_2CCF_3 \cdot 0.25HO_2CCF_3$; B=$CuO_2CCF_2Cl$; C=$CuO_2CC_3F_7$; D=$CuO_2CC_2F_5$. I=cyclohexyl benzene; II=methyl biphenyl; III=diphenyl methane; IV=i-propyl biphenyl; V=m-chloro toluene; VI=2-chloro-p-xylene.

What is claimed is:

1. A method of separating a complexible ligand selected from the group consisting of $C_2$–$C_6$ acetylenes, $C_2$–$C_{20}$ monoolefins, $C_4$–$C_{20}$ conjugated diolefins, $C_6$–$C_9$ aromatics and carbon monoxide from a feedstream containing the ligand comprising contacting said feedstream with complexing solutions containing mixtures of cuprous salts having the formula $CuO_2CC_nX_wX_yX_z$ wherein $n$ is an integer varying from 1 to 6, $X_w$, $X_y$ and $X_z$ are independently selected from the group consisting of fluorine, chlorine and bromine atoms, $w$, $y$ and $z$ are integers varying from 0 to $2n+1$ and where $w+y+z$ is $2n+1$, dissolved in selected low volatile aromatic solvent moieties; said contacting carried out under conditions wherein the ligand is selectively complexed and thereby removed from the feedstream.

2. The method of claim 1 wherein the solvents are selected from the group consisting of substituted and unsubstituted aromatics boiling in the range of from about 120° to about 500° C.

3. The process of claim 2 wherein the substituted aromatics are selected from the group consisting of substituted benzenes, substituted biphenyls, alkyl substituted biphenyls and their mixtures.

4. The process of claim 3 wherein the substituents on the aromatics are selected from the group consisting of straight and branched alkyl side chains having from 1 to 20 carbon atoms, chloro and bromo atoms.

5. The process of claim 1 wherein the contacting is conducted at temperatures in the range of from about 20° to about 100° C.

6. The process of claim 1 wherein the ligands to be recovered are ethylene and propylene.

7. The method of claim 1 wherein said solvent is a mixture of monoisopropyl biphenyl isomers.

8. The method of claim 1 wherein the cuprous salts employed are further selected from mixtures of $CuO_2CCF_3$, $CuO_2CCF_2Cl$, $CuO_2CC_3F_7$ and $CuO_2C_2F_5$.

9. The method of claim 4 wherein said alkyl side chains contain from 1 to 6 carbon atoms.

10. A method of selectively separating ethylene and propylene from gaseous mixtures containing same which comprises contacting said mixtures with a complexing solution containing mixtures of cuprous salts of fluorocarboxylic acids having the formula $CuO_2CC_nX_wX_yX_z$ wherein $n$ is an integer varying from 1 to 6, $X_w$, $X_y$ and $X_z$ are independently selected from the group consisting of fluorine, chlorine and bromine atoms, $w$, $y$ and $z$ are integers varying from 0 to $2n+1$ and where $w+y+z$ is $2n+1$, said salts being dissolved in low volatile aromatic solvents selected from the group consisting of chlorobenzenes, alkyl substituted chlorobenzenes, chlorobiphenyls, alkyl substituted biphenyls, alkyl substituted chlorobiphenyls and mixtures thereof; said contacting being conducted under conditions whereby ethylene and propylene are selectively complexed and thereby removed from said gaseous mixture.

11. The method of claim 10 wherein the cuprous salt mixtures employed comprise materials selected from the group consisting of $CuO_2CCF_3$, $CuO_2CCF_2Cl$, $$CuO_2CC_3F_7$$

and $CuO_2C_2F_5$.

12. The method of claim 10 wherein said low volatile aromatic solvents have a boiling point in the range of from about 150° to about 350° C.

13. The method of claim 10 wherein the contacting is conducted at temperatures in the range of from about 20° to about 100° C.

14. The method of claim 10 wherein the solvent is a mixture of monoisopropyl biphenyl isomers.

15. The method of claim 1 wherein said ligand is further selected from the group consisting of $C_2$–$C_4$ acetylenes, $C_2$–$C_5$ monoolefins, $C_6$–$C_9$ aromatics and carbon monoxide.

References Cited

UNITED STATES PATENTS

| 3,520,947 | 7/1970 | Blytas | 260—681.5 C |
| 3,401,112 | 9/1968 | Dunlap et al. | 260—681.5 C |
| 3,517,081 | 6/1970 | Beckham et al. | 260—677 |
| 3,218,366 | 11/1965 | Baxter | 260—677 |

DELBERT E. GANTZ, Primary Examiner

J. M. NELSON, Assistant Examiner

U.S. Cl. X.R.

260—438.1, 681.5 C; 208—308